(No Model.)
H. SPRINGER.
Spring Cultivator Tooth.
No. 231,368.          Patented Aug. 17, 1880.
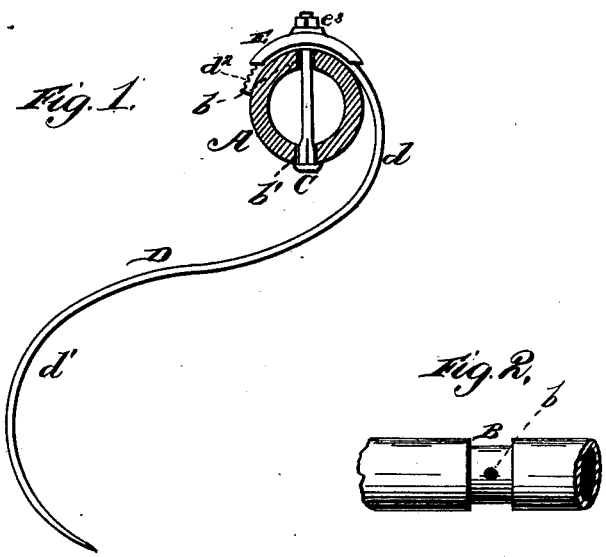
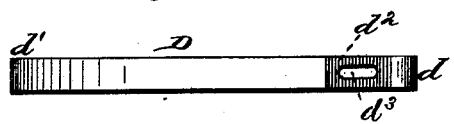
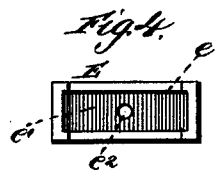
WITNESSES          INVENTOR
Henry Springer.
Gilmore, Smith & Co.
ATTORNEYS

UNITED STATES PATENT OFFICE.

HENRY SPRINGER, OF VICKSBURG, MICHIGAN.

SPRING CULTIVATOR-TOOTH.

SPECIFICATION forming part of Letters Patent No. 231,368, dated August 17, 1880.

Application filed March 27, 1880. (No model.)

*To all whom it may concern:*

Be it known that I, HENRY SPRINGER, of Vicksburg, in the county of Kalamazoo and State of Michigan, have invented certain new and useful Improvements in Spring Cultivator-Teeth; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my cultivator-tooth. Fig. 2 is a detail view of the hollow cylinder. Fig. 3 is a plan view of my cultivator-tooth detached, and Fig. 4 is a detail view.

The nature of my invention relates to means for attaching spring cultivator-teeth to the bars of the main frame.

The improvement consists in forming the upper end of the spring-tooth with serrations and slot, and in clamping upon such end of the spring a curved grooved plate having serrations adapted to engage with the serrated portion of the tooth, the said tooth being fitted at its upper end in a groove of the bar and in a serrated groove of the curved plate, all of said devices being firmly held together by a bolt passed through the curved plate, tooth, and bar, as hereinafter set forth and claimed.

A designates a section of a hollow cylindrical rod to which the spring cultivator-teeth are attached.

B is a circumferential groove of the said rod, and $b\ b'$ holes through which the bolt C is passed, the hole $b$ being round to receive the round portion of said bolt, and the hole $b'$ being made square to receive the squared portion of the bolt, whereby the bolt is prevented form turning.

D designates the spring-tooth, which is curved somewhat like the letter S, the upper curved part, $d$, being, however, considerably smaller than the lower part, $d'$. A portion of the part $d$ is serrated, as at $d^2$, and it is formed with a slot, $d^3$, through which the bolt C is passed.

E is a curved clamp-plate, formed with a groove to receive the spring-tooth. The side walls or flanges $e$ of this grooved portion of the clamp-plate embrace the sides of the serrated portion of the spring-tooth, so as to constitute side bearings for it; and the clamp-plate has serrations $e'$ upon its under side, which engage with the serrated portion of the tooth, thereby preventing any slipping of the parts when held together by the bolt, which also passes through a hole, $e^2$, in the curved plate.

The clamp plate or washer E is held upon the tooth by a nut, $e^3$, which is screwed upon the end of the bolt. By loosening the nut the tooth may be adjusted to the extent of its slot, and hence the spring-tooth may be set to the required pitch or angle.

I am aware that an elastic tooth has been connected with the axle or rake-head of a horse hay-rake by a saddle and hook bolt, as seen in Patent No. 125,216 of April 2, 1872; also, that elastic harrow or cultivator teeth have been secured to their respective beams so as to be longitudinally adjustable to raise or depress their points and at the same time permit them to be rigidly secured to the beams. I therefore make no broad claim to an adjustable tooth capable of being rigidly secured, as above, but confine myself to the improved construction herein shown and described.

What I claim is—

The combination of the circumferentially-grooved bar A with the spring-tooth D, having a serrated part, $d^2$, and a slot, $d^3$, the curved clamp-plate E, formed with a groove to receive the spring-tooth, and having serrations $e'$ and a hole for the passage of the bolt, said parts being adjusted as described, and clamped together by a nut upon the end of the bolt, in the manner specified.

In testimony that I claim the above I have hereunto subscribed my name in the presence of two witnesses.

HENRY SPRINGER.

Witnesses:
 MATHEW VAN DUSEN,
 J. W. SCOTT.